United States Patent [19]

Gottemoller et al.

[11] Patent Number: 5,307,632

[45] Date of Patent: May 3, 1994

[54] ENGINE AND METHOD FOR TURBO BOOSTED OPERATION OF A MECHANICALLY ASSISTED TURBOCHARGER IN A TWO CYCLE ENGINE

[75] Inventors: Paul Gottemoller, Palos Park; Monique M. Yeager, Countryside, both of Ill.

[73] Assignee: General Motors Corporation, Detroit, Mich.

[21] Appl. No.: 25,027

[22] Filed: Mar. 2, 1993

[51] Int. Cl.[5] .......................................... F02B 33/44
[52] U.S. Cl. ....................................... 60/608; 60/603
[58] Field of Search ................ 60/608, 607, 605.1, 60/601, 603

[56] References Cited

U.S. PATENT DOCUMENTS

| | | | |
|---|---|---|---|
| 2,402,725 | 6/1946 | Birkigt | 60/608 |
| 3,667,214 | 6/1972 | Addie | 60/608 |
| 4,445,337 | 5/1984 | McCreary | 60/608 |
| 4,719,818 | 1/1988 | McCreary | 60/608 |

*Primary Examiner*—Richard A. Bertsch
*Assistant Examiner*—Charles G. Freay
*Attorney, Agent, or Firm*—C. K. Veenstra

[57] ABSTRACT

A two cycle, preferably diesel, engine has a turbocharger with an exhaust driven turbine and supplemental mechanical drive maintaining a fixed minimum turbine/engine speed ratio with fuel efficient freewheeling (fully exhaust sustained) turbine operation at higher speeds and loads. A turbo boost system provides freewheeling turbine operation at intermediate speeds where it might or will not otherwise occur. When an intermediate speed is reached at which freewheeling can be sustained but is not occurring, the system 1) temporarily increases engine speed to a predetermined higher level to accelerate the turbine and increase engine air flow, 2) increases engine fuel input to a higher level capable of sustaining freewheeling, and 3) reduces engine speed to the selected intermediate speed while maintaining a fuel input level adequate to maintain turbine freewheeling. Methods and means for providing and controlling intermediate speed freewheeling operation are disclosed.

17 Claims, 6 Drawing Sheets

ENGINE AND METHOD FOR TURBO BOOSTED OPERATION OF A MECHANICALLY ASSISTED TURBOCHARGER IN A TWO CYCLE ENGINE

TECHNICAL FIELD

This invention relates to turbocharged two cycle engines wherein the turbocharger has a mechanical drive for maintaining a minimum turbocharger/engine speed ratio and to means and methods for operating such engines with exhaust sustained turbocharging at relatively low engine speeds. In a particular embodiment, the invention relates to two cycle diesel engines with gear driven turbochargers capable of turbine freewheeling, i.e. overrunning the gear train in exhaust sustained supercharging operation.

BACKGROUND

It is known in the art relating to two cycle diesel engines for use in locomotives and other applications to provide a turbosupercharger (turbocharger) having a rotor including both compressor and turbine wheels and connected with the engine crankshaft by a gear train for driving the turbine, i.e. the turbocharger rotor, at a fixed minimum speed ratio relative to the engine (crankshaft) rotational speed. It should be understood that reference to an operating condition of the turbine, as is common among those skilled in the art, also applies where appropriate to the complete rotor including both turbine and compressor wheels.

The gear train includes an overrunning clutch that allows the turbine to freewheel, i.e overrun the mechanical drive and be driven solely by exhaust gas energy, at speeds higher than those of the fixed ratio. This provides for supercharging of the engine cylinders at higher engine speeds and loads where the energy in the exhaust gas is adequate for exhaust sustained turbocharger operation.

In one line of well known current production two cycle diesel engines used for railway, marine, powerplant and industrial applications, a gear and exhaust driven turbocharger similar to those of U.S. Pat. Nos. 3,667,214 granted Jun. 6, 1972 and 4,719,818 granted Jan. 18, 1988 is provided for supplying scavenging and charging air to the engine air box for delivery through ports to the engine cylinders.

As used in railway road locomotive (as opposed to switcher) applications it is common to provide a throttle control having eight engine speed settings from idle to full speed. A load control system controls the load applied to the engine by an engine driven generator to normally provide predetermined engine power settings for each power throttle speed setting from 1 to 8. The power settings are preselected to match the engine output with a desired power curve within scavenging and charging air pressure levels provided by the turbocharger. In general, these increase with the engine and turbocharger speed, but the charging pressure or pressure ratio increases significantly when the exhaust gas energy becomes sufficient to drive the turbine above the mechanically driven speed. Above this point, the air flow and pressure available are controlled by the combustion fuel energy which is limited by the full rack injector fuel injection capacity and the ability of the charging air supplied to cleanly burn this fuel (without significant exhaust smoke).

Thus at the full engine speed and in throttle setting 7, the turbocharger operation is almost always fully exhaust sustained and the full power setting takes account of the high pressure level provided in the engine cylinders. At throttle setting 6, ambient conditions of temperature, pressure, etc. may allow free wheeling (exhaust sustained) operation and, at lower throttle settings, the turbocharger operates at the speed determined by the mechanical drive ratio. The engine load at these lower throttle settings is substantially derated by matching fuel input to the limited charging air available during mechanically driven turbocharger operation and by the necessity of avoiding smoke during engine acceleration from lower to higher throttle settings.

SUMMARY OF THE INVENTION

The present invention provides a method and means for operating a two cycle engine, particularly but not exclusively a diesel engine of the type described, in a manner that obtains consistent exhaust sustained turbocharger operation at lower engine speeds than is provided with the prior control scheme. The method, called turbo boost, results in engine operation at higher loads without significant smoke and with potentially improved efficiency in intermediate throttle settings capable of supporting exhaust sustained turbocharger operation and during acceleration.

In simple form, the turbo boost method involves accelerating the engine to a selected intermediate throttle setting, at which the turbocharger would not be assured of exhaust sustained operation if limited to the prior load/speed relationship, by the method of 1) temporarily increasing engine speed to a higher throttle and load setting wherein initiation and maintenance of exhaust sustained operation is assured;

2) raising fuel delivery to a level adequate to maintain exhaust sustained operation of the turbocharger; and 3) reducing engine speed to the selected intermediate throttle setting while controlling fuel delivery to a level adequate to maintain exhaust sustained turbocharger operation at the conditions of the reduced engine speed.

The method may further include sensing the engine and turbocharger speeds and exhaust smoke and or other significant conditions of the engine and associated devices and returning the engine to a normal load factor if abnormal conditions are present, such as the turbine speed falls to near the mechanical drive speed or the exhaust smoke exceeds an established value.

Means provided for carrying out the operating method include the prior engine speed governor and load control system including a digital computer programmed to control the engine driven generator output in accordance with the preselected engine speed setting as modified under various operating conditions. The special functions of the present invention which are programmed into the computer are performed as shown in the flow diagrams of FIGS. 3-5.

These and other features and advantages of the invention will be more fully understood from the following description of certain specific embodiments of the invention taken together with the accompanying drawings.

BRIEF DRAWING DESCRIPTION

In the drawings:

FIG. 1 is a side elevational view of a two cycle diesel engine/generator combination having an exhaust/gear driven turbocharger with engine speed/load control FIG. 2 is a diagram illustrating a speed/load control system for the engine/generator of FIG. 1;

FIGS. 3a and 3b comprise a flow diagram showing the special throttle six mode of operation of the system in accordance with the invention.

FIGS. 4a and 4b comprise a flow diagram showing operation of the turbo boost executing function of the system; and FIG. 5 is a flow diagram showing the operation of the turbocharger condition determining function of the system;

DETAILED DESCRIPTION

Figure 1:
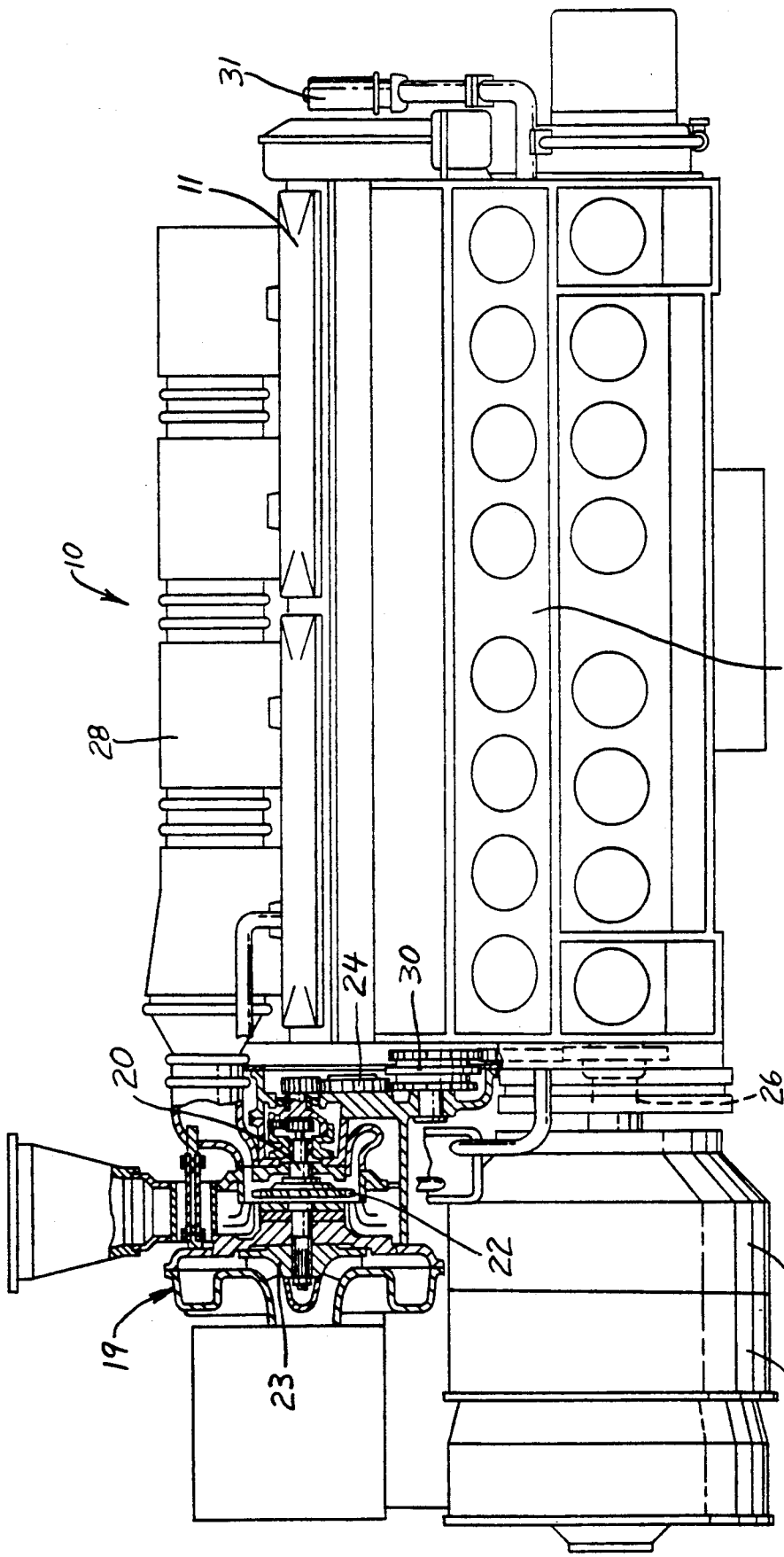

Referring now to the drawings in detail, numeral 10 generally indicates a power plant comprising a two cycle diesel engine 11 directly connected with an AC main generator 12. A commonly mounted companion alternator 14 supplies power through an SCR 15 for exciting the generator fields to control generator power output. As installed in a diesel locomotive, not shown, the power plant 10 supplies electric power through switchgear 16 for driving the locomotive traction motors 18 and for other purposes.

At the rear end of the engine, a turbocharger 19 is mounted overhanging the generator. The turbocharger has internally a rotor 20 including a turbine wheel 22 commonly mounted with a compressor wheel 23. The rotor connects through a gear train 24 with the engine crankshaft 26 for directly driving the rotor from the crankshaft at a fixed speed ratio relative to engine rotational speed. The compressor portion of the turbocharger 19 supplies air to an airbox 27 of the engine for delivery to the engine cylinders, not shown.

Exhaust gas from the cylinders is conducted by an exhaust manifold 28 to the turbine portion of the turbocharger for driving turbine wheel 22 and thereby the rotor 20. A free wheeling or overrunning clutch 30 in the gear train allows the turbine 22 to be driven by exhaust gas energy at speeds above those of the fixed ratio provided by the gear train mechanical drive and thereby increase the pressure ratio of the scavenging and charging air delivered to the cylinders.

At the front end, the engine 11 mounts a governor 31 through which charges of fuel injected into the engine cylinders are controlled to maintain a selected engine speed (of crankshaft rotation). The governor mechanism provides a series of eight throttle settings of specific engine speeds at which the engine is capable of being selectively operated by the governor.

Figure 2:
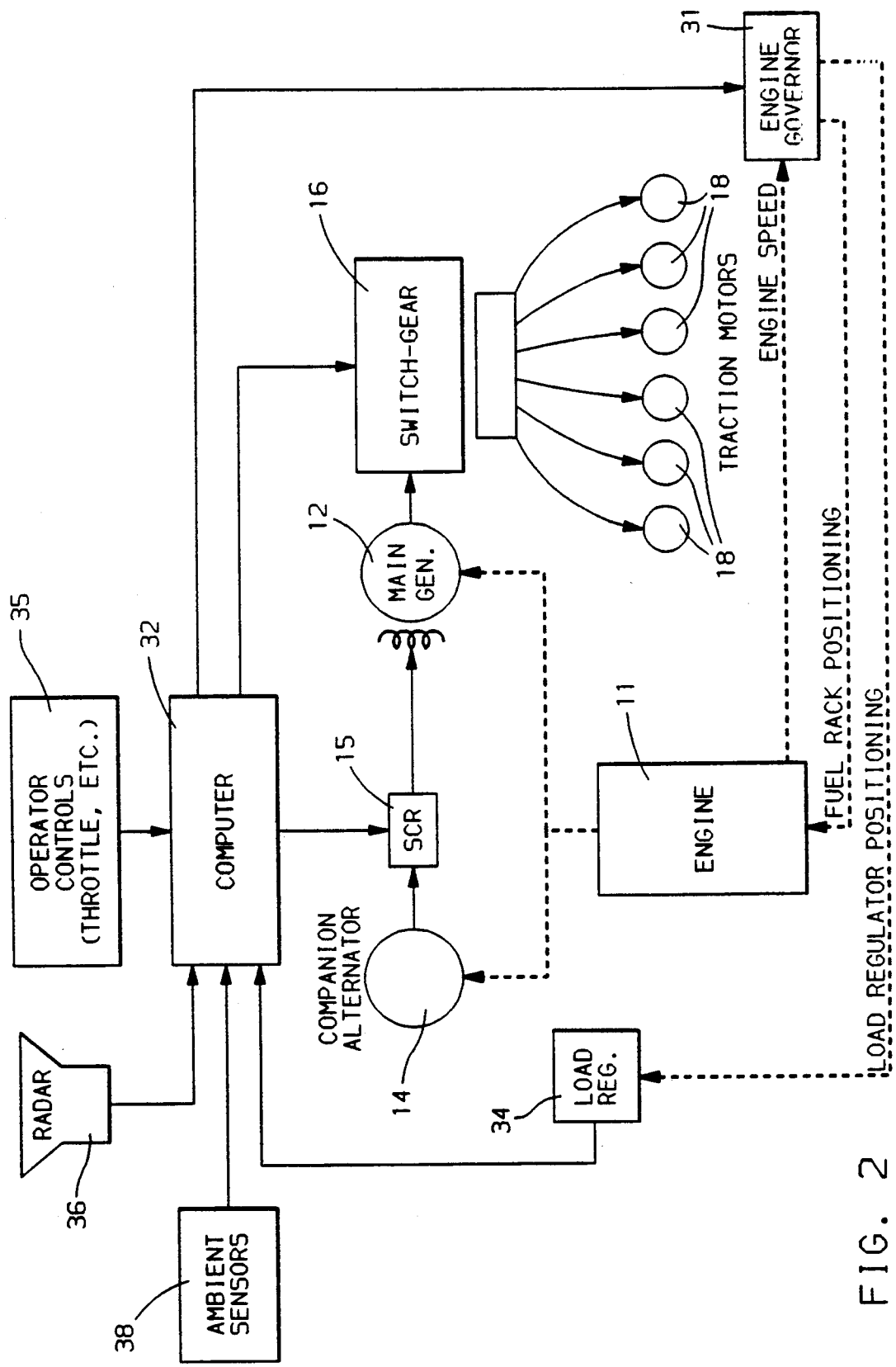

Engine speed and load control are effected and monitored through a digital computer 32 which, as shown in FIG. 2, is connected with the engine speed governor 31 and the excitation controlling SCR and a governor connected load regulator 34 to control the load applied to the engine and the engine speed at the desired levels in accordance with the throttle selections made by the locomotive operator. The computer 32 is responsive to operator controls 35 providing throttle settings and other information, radar 36 indicating locomotive speed and ambient sensors 38 as well as other feedback information, not illustrated, including engine speed, turbine speed, main generator voltage and current and traction motor air temperature.

In accordance with the prior control schedule, the computer 32 normally sets the governor 31 at the speed setting selected by the locomotive operator controls 35 and the governor adjusts fuel input to maintain the selected speed. The load control program provides established load settings normally maintained for each speed setting with modifications being established for abnormal conditions which are sensed and input to the computer.

In accordance with the invention, as applied to a particular embodiment, an additional or supplemental mode of operation called "turbo boost" is programmed into the computer 32. Turbo boost provides a method by which the turbocharger can be made to freewheel (i.e. initiate and maintain exhaust sustained operation) when the engine speed setting is below that which would ordinarily or necessarily result in freewheeling. This may be accomplished without creating unacceptable smoke levels near the departure point. Significant fuel economy benefits should result from freewheeling operation as opposed to operation on the gear train at the same engine speed.

In an exemplary embodiment, turbo boost operates to 1) temporarily increase engine speed (by increasing the governor speed setting) such that the turbine speed is raised a predetermined amount (speed differential), such as 1000 rpm, above the gear train driven speed at the desired speed setting (original departure point), 2) apply a load (by increasing generator excitation) causing the governor to increase the fuel rate in an amount adequate to sustain or increase the turbine speed differential at the original engine speed, and 3) reduce the engine speed to the original set speed while maintaining the higher load when the turbine input energy has reached the desired level. This maintains a higher fuel rate at the reduced engine speed which places the turbocharger in a freewheeling condition at part engine speed without the negative results of excessive smoke at the departure point or bogging of the engine due to inadequate air for the fuel supplied.

Additional contemplated features of the method include 4) maintaining freewheeling with the desired minimum speed differential by maintaining the applied load at a level to provide fuel energy to keep up the turbine speed, and/or reducing engine speed when a load reduction is required so that the turbine speed can be kept above the departure point with the minimum speed differential at the reduced engine speed and load.

Figure 4A:
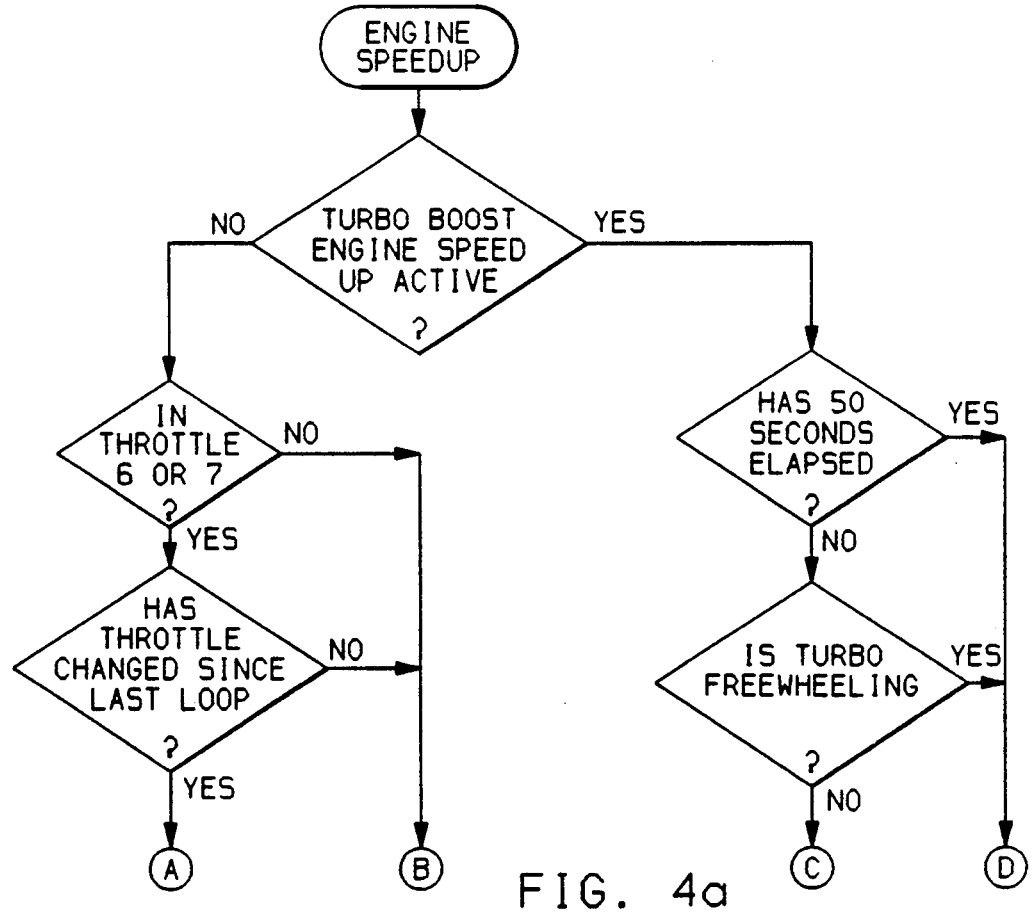
Figure 4B:
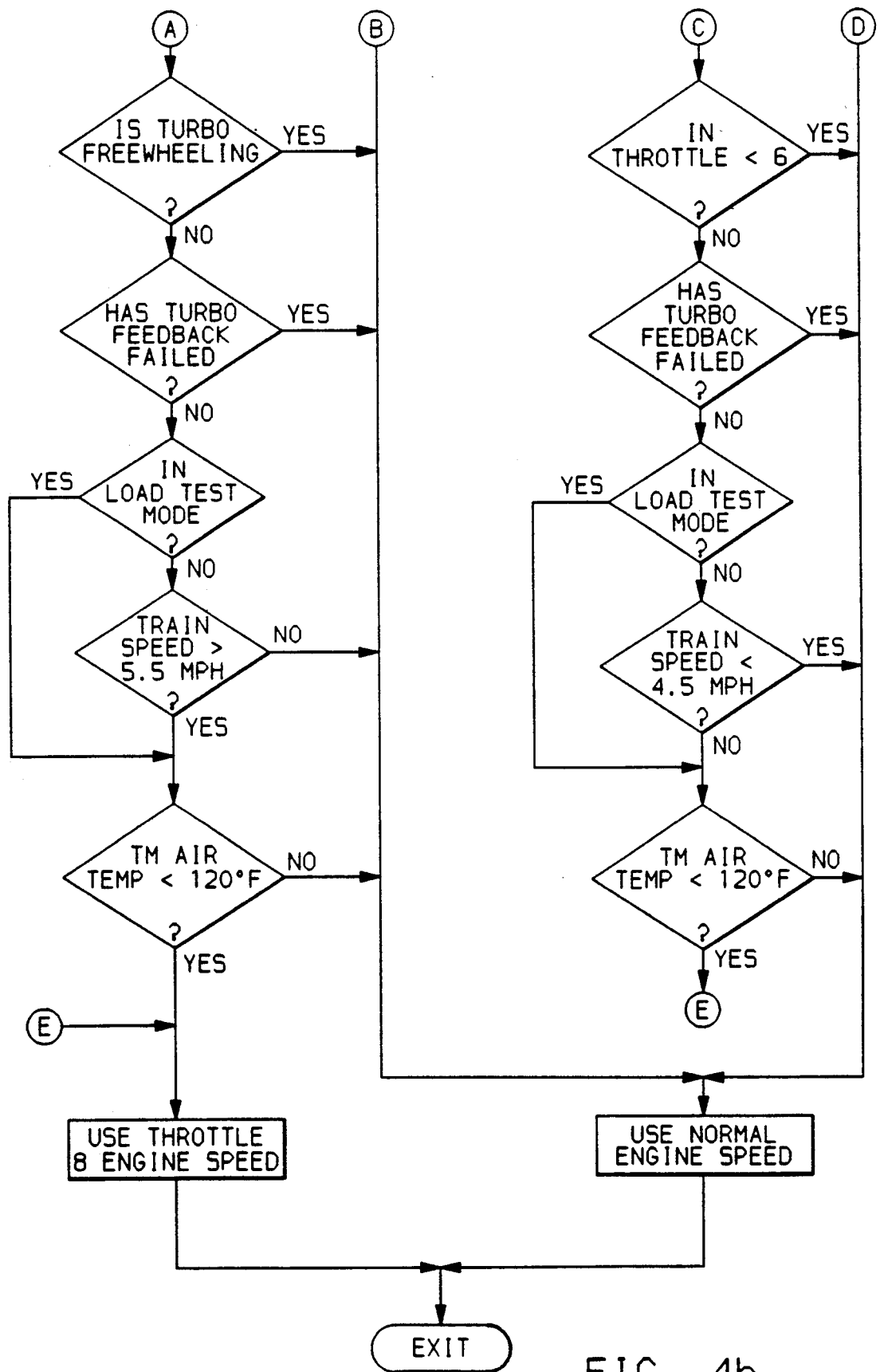
Figure 5:
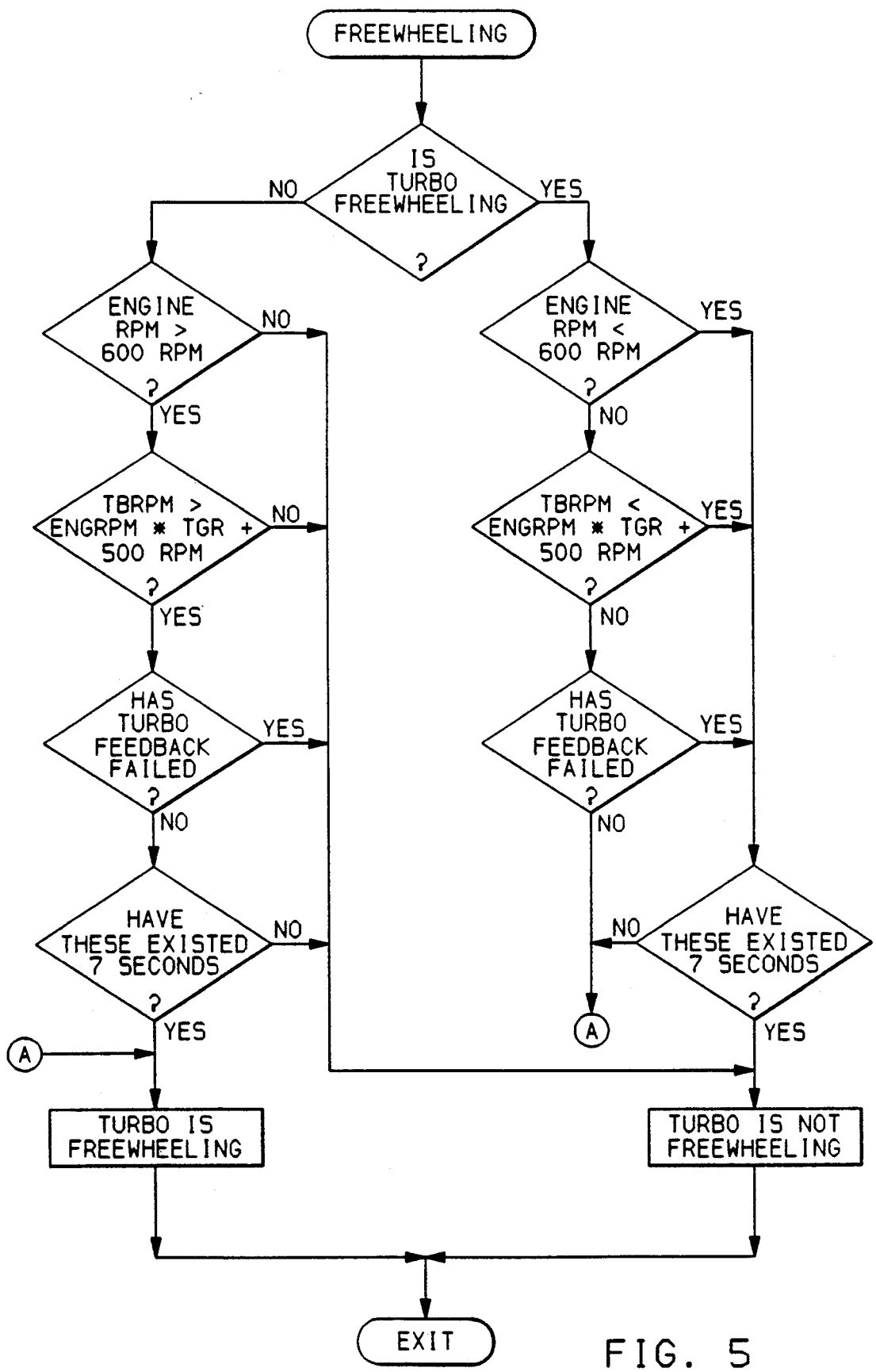

A simplified version of turbo boost designed to insure that, in an exemplary engine embodiment, the turbocharger freewheels in the sixth throttle position and above is illustrated in the flow diagrams of FIGS. 3-5. It recognizes that in throttle eight, the turbine always freewheels while in throttle six or seven, freewheeling with the normal load factors depends upon conditions such as altitude, ambient pressure and prior operating conditions.

Figure 3A:
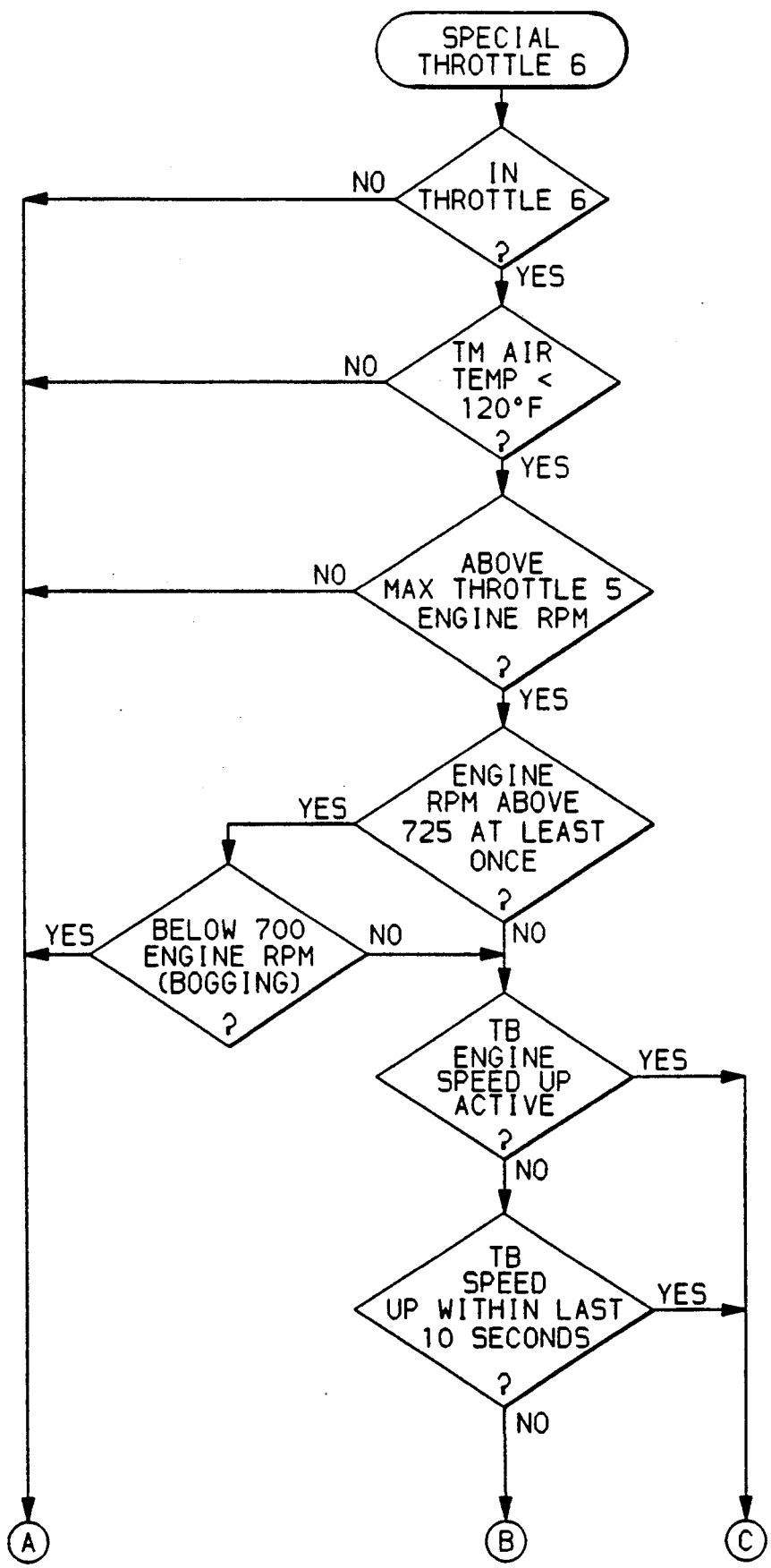
Figure 3B:
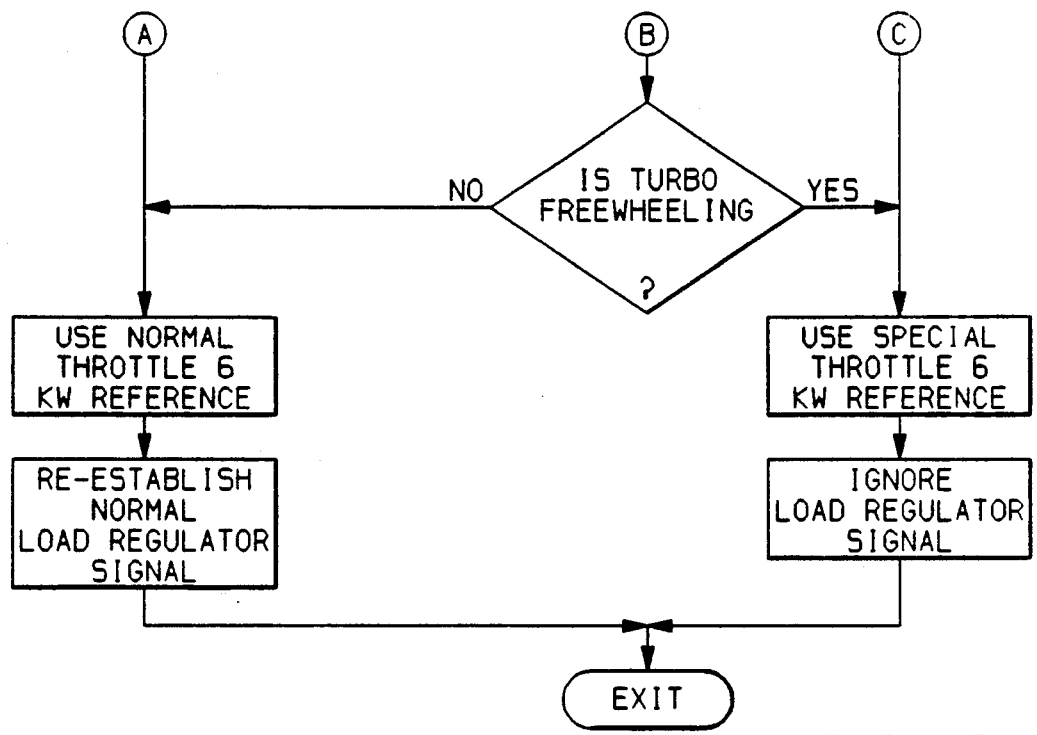

FIGS. 3a and 3b illustrate the conditions needed to establish operation in the special throttle six mode and apply the increased load factor provided.

If the throttle setting is six and the traction motor air temperature is below 120° F. and the engine speed is above the maximum for throttle 5 and, if it has once exceeded 725 rpm, the minimum speed for throttle 6, it is not now less than 700 rpm and the turbine boost speed up is active or was active within the last 10 seconds or the turbine is freewheeling then the higher load factor is applied.

However, if the engine is not in throttle six or the traction motor air temperature is not less than 120° F. or the engine speed is below the maximum for throttle 5 or is below 700 rpm after having once exceeded 725 rpm or the turbine boost speed up has not been active within the last 10 seconds and the turbine is not freewheeling then the normal load factor will be applied unless a different factor is otherwise called for.

A similar set of conditions could be applied for operation in throttle seven with a special load factor for that throttle condition applied when appropriate operating conditions are established as previously indicated.

FIGS. 4a and 4b illustrate the conditions required to establish or maintain turbine boost engine is speed up.

If turbine boost speed up is not active but the throttle is in position six or seven and has changed since the previous check and the turbine is not freewheeling and the turbine speed feedback is valid and the train speed is more than 5.5 mph (unless the locomotive is being load tested) and the traction motor air temperature is less than 120° F. then engine speed setting is increased to throttle eight to raise the turbine speed to a departure level. However, nonexistence of any of these conditions avoids the speed increase.

If boost speed up is active, it is retained unless 50 seconds has elapsed since it was activated or the turbine is freewheeling or the throttle setting is below throttle six or the turbine speed feedback has failed (become invalid) or the train speed has dropped below 4.5 mph (except in load test mode) or the traction motor temperature has risen above 120° F., whereupon the engine will be returned to normal speed.

Because some features of turbo boost depend upon whether the turbine is free wheeling, that state has been given a precise definition, the status of which is determined as shown in FIG. 5.

If the turbine is not indicated as freewheeling but the engine speed is greater than 600 rpm and the turbine speed is greater than the engine speed times the turbocharger gear ratio by a set margin such as 500 rpm and the turbine speed feedback information is valid and these conditions have existed for at least seven seconds then the turbine condition is changed to freewheeling. However, if any of these conditions does not exist, then the non-free wheeling indication is not changed.

When a freewheeling condition has been indicated, it is retained unless the engine speed drops below 600 rpm or the turbine speed drops below a set margin such as 500 rpm over engine speed times the gear ratio or the turbine speed feedback has failed and any of these conditions has existed for more than seven seconds, whereupon the turbine condition indication is returned to non-freewheeling.

Thus, in operation, the engine operates normally until the engine throttle is raised to position six. Then, if all conditions are met, the engine speed is raised to the throttle eight speed and the load is increased to the prescribed load factor. After 50 seconds or when the turbine freewheels, the engine speed is reduced to the throttle six speed and the turbine freewheeling is sustained by exhaust gas energy at the higher load factor of the special throttle six setting.

Operation in throttle seven provides a similar set of conditions, however raising the setting to throttle eight returns the system to the normal conditions where the engine full rated load operation maintains the freewheeling of the turbine. Also, reducing the throttle below throttle six returns the system to normal operation where the exhaust energy will be inadequate to sustain freewheeling of the turbine and turbine speed will be determined by the gear ratio.

It should be understood that other load factors and speed-up sequences could be applied at lower throttle positions if desired and permitted by the other locomotive operating conditions so that freewheeling operation of the turbocharger might be obtained in some of the lower throttle positions.

When applied with a fully electronic fuel control system allowing infinitely variable speed, load and injector timing control, it is contemplated that turbo boost can be applied to obtain even more effective improvements in fuel economy and wear. Testing so far has indicated that a two cycle diesel engine using turbo boost can be operated at up to about half of full load at half the rated full engine speed. In comparison, a four cycle turbocharged diesel engine designed for best fuel economy at full speed and full load will normally produce only about ten percent of full rated power when operating at half the rated speed. The difference results from the characteristic of a turbocharged two cycle engine to act as an orifice through which the turbocharger pumps air in the scavenging portions of the pistons operating cycles, allowing the turbine speed to be maintained somewhat independent of engine speed, while the speed related pumping capacity of the pistons in a four cycle engine restricts the volume of air which can be delivered through the engine to the turbocharger.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

What is claimed is:

1. A method of operating a two cycle engine having a scavenging and charging turbocharger driven by exhaust gas energy supplemented by mechanical means which maintain a minimum ratio of turbocharger/engine speed when exhaust energy is below a level sufficient for exhaust sustained turbocharger operation, the method comprising the steps of temporarily increasing engine speed to raise turbocharger speed to a level adequate for initiation of exhaust sustained turbocharger operation, providing fuel adequate to deliver exhaust energy sufficient to initiate and maintain exhaust sustained turbocharger operation, and reducing engine speed to a lower level while maintaining fuel delivery adequate to continue exhaust sustained turbocharger operation at the reduced speed.

2. A method as in claim 1 and further including establishing operational parameters for initiating and maintaining operation of the engine with the increased fuel delivery required to assure exhaust sustained turbocharger operation, and discontinuing increased fuel delivery level whenever one of the parameters is exceeded.

3. A method as in claim 2 wherein the parameters include maximum time intervals for attaining and failing to maintain a turbine speed differential exceeding by at least a preset value the minimum speed established by the ratio of the mechanical means.

4. A method of operating a railway locomotive two cycle diesel engine having a scavenging and charging turbocharger driven by exhaust gas energy supplemented by mechanical means which maintain a minimum ratio of turbocharger/engine speed when exhaust energy is below a level sufficient for exhaust sustained turbocharger operation, the engine having control means providing a preset group of speed/load settings calling for low, intermediate and high speeds wherein at least one of the settings for intermediate speeds is inadequate to assure exhaust sustained turbocharger operation, the method comprising the steps of selecting the setting for said one intermediate speed,
  temporarily increasing engine speed above said one intermediate speed to mechanically raise turbocharger speed to a level adequate for initiation of exhaust sustained turbocharger operation,
  providing fuel adequate to deliver exhaust energy sufficient to initiate and maintain exhaust sustained turbocharger operation, and
  reducing engine speed to said one intermediate speed while maintaining fuel delivery adequate to continue exhaust sustained turbocharger operation at said one intermediate speed.

5. A method as in claim 4 and further including establishing operational parameters for initiating and maintaining operation of the engine with the increased fuel delivery required to assure exhaust sustained turbocharger operation, and discontinuing increased fuel delivery whenever one of the parameters is exceeded.

6. A method, in claim 5 wherein the parameters include at least one of increased engine speed operation, prior increased engine speed activity within a prescribed time limit and attaining and maintaining turbine freewheeling comprising a speed exceeding by at least a preset value the minimum turbine speed established by the ratio of the mechanical means.

7. A method as in claim 4 wherein the engine drives a generator connectable with locomotive traction motors and the control means are operative to adjust the generator power in accordance with the speed settings and predetermined parameters.

8. A method as in claim 7 wherein parameters for initiating and maintaining said step of temporarily increased engine speed include non-free wheeling turbine operation.

9. A method as in claim 8 wherein said parameters further include maintaining a speed setting not less than said one intermediate speedy.

10. Control means for operating a railway locomotive two cycle diesel engine having a scavenging and charging turbocharger driven by exhaust gas energy supplemented by mechanical means which maintain a minimum ratio of turbocharger/engine speed when exhaust energy is below a level sufficient for exhaust sustained turbocharger operation, the control means providing a preset group of speed/load settings calling for low, intermediate and high speeds wherein at least one of the settings for intermediate speeds is inadequate to assure exhaust sustained turbocharger operation, the control means further comprising means responsive to operator control for selecting the setting for said one intermediate speed,
  means for temporarily increasing engine speed to a prescribed value above said one intermediate speed to mechanically raise turbocharger speed to a level adequate for initiation of exhaust sustained turbocharger operation,
  means for providing fuel adequate to deliver exhaust energy sufficient to initiate and maintain exhaust sustained turbocharger operation, and
  means for reducing engine speed to said one intermediate speed while maintaining fuel delivery adequate to continue exhaust sustained turbocharger operation at said one intermediate speed.

11. Control means as in claim 10 and further comprising means responsive to specified conditions for enabling initiation of the speed increasing step, said specified conditions including maintenance of a speed setting from a predetermined group of said intermediate speed settings.

12. Control means as in claim 11 wherein said specified conditions further include nonfreewheeling turbine operation.

13. Control means as in claim 12 wherein said specified conditions further include traction motor temperature below a prescribed value and locomotive speed greater than a prescribed value.

14. Control means as in claim 10 and further comprising means responsive to at least one of specified conditions for terminating said temporarily increased speed wherein said specified conditions include freewheeling turbine operation.

15. Control means as in claim 14 wherein said specified conditions further include reaching of a prescribed time limit for continuous increased speed operation.

16. Control means as in claim 15 wherein said specified conditions further include each of selection of a speed setting below said one intermediate speed, reaching a locomotive speed below a prescribed value, and reaching a traction motor temperature greater than a prescribed value.

17. Control means as in claim 10 wherein said means for providing fuel adequate to initiate exhaust sustained turbocharger operation include means for applying an increased load factor for generator power, said control means further comprising means responsive to at least one of specified conditions for initiating the application of the increased load factor, wherein said specified conditions include freewheeling turbine operation, increased engine speed operation, and prior increased engine speed activity within a prescribed time limit.

* * * * *